Figure 2:
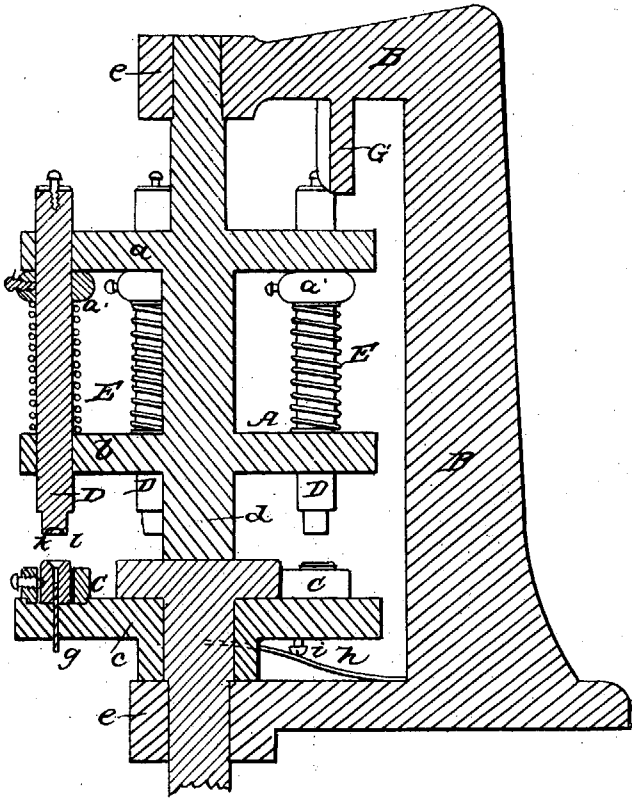

J. C. RHODES.

Capping Tacks.

No. 2,521. Reissued March 19, 1867.

Witnesses

Samuel N. Pykes

George Ruckers

Inventor

John C. Rhodes

By his attorney

R. H. Eddy

N. PETERS, Photo-Lithographer, Washington, D. C.

UNITED STATES PATENT OFFICE.

JOHN C. RHODES, OF SOUTH ABINGTON, MASSACHUSETTS.

IMPROVED MACHINE FOR CAPPING TACKS.

Specification forming part of Letters Patent No. 56,268, dated July 10, 1866; Reissue No. 2,521, dated March 19, 1867.

*To all whom it may concern:*

Be it known that I, JOHN C. RHODES, of South Abington, in the county of Plymouth and State of Massachusetts, have invented a new and Improved Machine for Capping Tacks, &c.; and I do hereby declare that the following is a full, clear, and exact description thereof, which will enable those skilled in the art to make and use the same, reference being had to the accompanying drawings, forming part of this specification.

The present invention relates to a new and improved machine intended more especially for the capping of tacks, nails, screw-heads, &c., or, in other words, covering them with a metallic or other similar cover or cap, although it may be applied to or used for other and various purposes, the said machine consisting—

First, of a frame arranged to revolve in a horizontal plane and carrying a series of movable vertical plungers and fixed dies, with the former directly above the latter in each case, in combination with a stationary or fixed cam, so arranged with regard to the upper ends of the vertical plungers that as they in turn pass under the same they will be thereby forced or moved down upon the dies below, when, having passed by the said cam, they are thrown up or back to their original positions by spiral or other suitable springs properly arranged in connection with them therefor. The upper endss of the dies are hollowed out or made concave, to receive the heads of the tacks which are to be capped, the shanks of such tacks passing into openings in the center of the dies. Corresponding to the concavity of the dies, the end of the plungers which come in contact with them are hollowed out or made concave, with their edges rounded, as well also as those of the dies, so that when brought down and upon the tack-heads placed in the dies, together with the metallic or other cap or cover which is to be secured upon them, they will so act upon such caps as to force or compress its edges around and over the edges of the head of the tack, nail, or other article, the peculiar form of the dies and plungers above stated forming the second part of my invention.

Third, in combining with the die made hollow or bored out in its center to receive the shank of the tack, nail, or other article which is to be capped a device so arranged within the center of the die and operated at the proper time or times as to automatically throw out or discharge the tack, &c., from the die after being capped therein.

In the accompanying plate of drawings my improved machine for capping tacks, &c., is illustrated.

Figure 1:
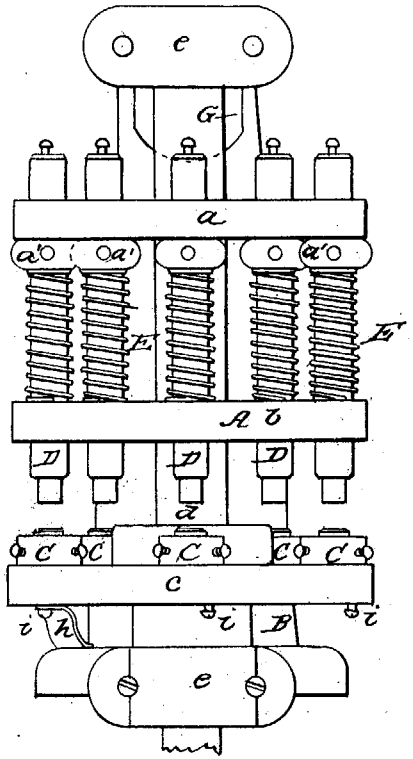

Figure 1 is a front elevation, and Fig. 2 is a transverse section of the same.

A in the drawings represents a rotary frame composed of three circular wheels or plates, *a b c*, and a vertical shaft, *d*, arranged with respect to each other as shown. The journals of the shafts are sustained in boxes *e e* of a frame, B, the whole being so that the said frame A may be capable of being revolved horizontally about the axis of its shaft. The lower plate, *a*, supports a series of fixed vertical dies, C, arranged at equal distances apart. Each of these dies C is formed concave on its upper surface, as shown in section, Fig. 2, with a passage, *f*, leading from such concave end down through the center of the dies, to receive the shank of the tacks placed upon the upper ends of the dies with their heads up and in the concavity of such dies. In each of the said passages *f* is a clearer or discharger, *g*, for expelling the tacks from said passages after the heads of such tacks have been capped, as will be hereinafter described.

*h* is a spring fastened to the bed-plate of the frame B, which, by being snapped against the foot of the clearers at the proper time, is made to throw or lift up the same with a percussive force, and thus to expel the tack which may be in each of the dies as they in turn pass to the said spring by the rotation of the frame A which carries them, this spring *h*, for the above purpose, being operated by means of fixed studs *i*, projecting from the under side of the lower plate of the frame A at suitable points of the same, which studs, as the said frame rotates, in turn depress the said spring as they pass over it. When leaving it, the spring flies up suddenly, striking the lower end or foot of the clearer of the die, then in proper position for it, with great force, and by it driving out the tack in the passsge *f* of such die, as is obvious without any further explanation, the clearer dropping by its own weight back to its original position within the die, and thus in readiness for being again operated upon by the said spring when it again comes to the same, by continuing the rotation of the frame A.

Directly over each die C is a plunger, D, formed, as represented in Figs. 1 and 2, with the lower end or foot of each plunger concaved or hollowed out corresponding to the concavity of the dies, as shown at *k*. The concavity of the end of each of the plungers D is surrounded by an annular surface or rim, *l*, which I prefer to make rounded in shape and of such a width as to prevent the plungers from breaking away at or around the circumference or the edge of their respective cavities, as they are brought down and upon the dies, as will be presently explained, the concavities of the dies also being protected by a rim around them similar to that of the plungers. These plungers D are arranged in the two upper plates of the frame A, extending in vertical planes from one to the other, and, as before stated, directly over the dies in the plate below, each plunger being arranged so as to move up and down in a vertical plane, and being held elevated and being raised, when depressed, by means of a spiral spring, E, coiled about each of the same, and resting by its lower ends upon the center plate of the frame A, with a collar or ring, F, secured to each of the plungers, bearing against and upon their upper ends, these collars or rings being attached by set-screws, so as to be susceptible of adjustment upon the plungers, and also for being a limit to the upward movement of the plungers by coming to a stop or rest against the upper part of the plate, as is apparent without any further explanation.

G is a cam projecting downward from the neck of the frame A, and in and directly over the path of movement of the heads of the various plungers, which cam is of such a shape at its lower end that as each plunger in turn passes by and under the same it will cause such plunger to be depressed sufficiently to bring its lower or concave end down and upon the upper concave end of the die corresponding in position to such plunger.

In the operation of the machine hereinabove described, the frame A is to be put in revolution at a speed which will allow its several dies to be supplied with tacks and caps for the same as they pass in turn around, the cap for each tack consisting of a piece or disk of soft or other suitable metal or material made of a cup shape, and of a size sufficient to embrace the head and edges of such head of the tack which it is intended to cap with it.

In the running of my machine, each of the dies as they in turn pass around, and previous to the depression of the plunger of such dies by the action of the cam G, is supplied with a tack by inserting its shank in the center passage of such die with the tack-head up, and with one of the metallic disks or pieces of the shape hereinabove specified, which latter is laid upon and over the tack-head, when, the plunger of such die being depressed by the action of the cam G upon it as it passes under the same, it is brought down and upon the said metallic cap, compressing, contracting, and bending its edges underneath the tack-head, and thus firmly and securely fastening it to the said head, as is obvious, each tack, after being capped, as above explained, being thrown out of the die in which it was placed for being so capped by means of the clearer *g*, arranged and operating as hereinbefore particularly described.

By making the plungers and dies of a concave shape at their ends, which come together, as above explained, and with a protecting rim or edge around such concavities, not only are the dies and plungers prevented from becoming broken at their edges, but a more perfect fitting of the caps to the tack-heads is secured, as by the concave shape of the plungers as they come to bear against and upon the metallic caps such caps are made thereby to roll or come to their proper position upon the tack-head, if by accident or carelessness they should be placed a little to one side upon the dies by the operator or attendant of the machine—an advantage of considerable importance to the perfect capping of tacks, &c., and one which has never before been secured.

Although I have herein described my improved machine more particularly in connection with the capping of the heads of tack, it is obvious that it is as well applicable to nails, screw-heads, and other articles, and therefore I do not intend to limit myself to the capping of any one particular or special article, the invention consisting in the machine for accomplishing the result stated, and not to any particular article which may be capped in or by it.

I claim as new and desire to secure by Letters Patent—

1. The rotating frame A, having movable plungers D, provided with spiral or other suitable springs, and stationary dies C, in combination with one or more stationary cams, G, when all arranged together so as to operate substantially as and for the purpose described.

2. The combination, with the dies C, of the clearers or dischargers *g*, stud *i*, and spring *h*, substantially as and for the purpose specified.

JOHN C. RHODES.

Witnesses:

ALBERT DAVIS,
M. A. DYER.